United States Patent
Paltinisanu et al.

(10) Patent No.: US 10,654,516 B2
(45) Date of Patent: May 19, 2020

(54) STEERING COLUMN FOR A MOTOR VEHICLE

(71) Applicants: THYSSENKRUPP PRESTA AG, Eschen (LI); thyssenkrupp AG, Essen (DE)

(72) Inventors: Ciprian Paltinisanu, Eschen (LI); Hieronymus Schnitzer, Gamprin (LI)

(73) Assignees: THYSSENKRUPP PRESTA AG, Eschen (LI); THYSSENKRUPP AG, Essen (DE)

( * ) Notice: Subject to any disclaimer, the term of this patent is extended or adjusted under 35 U.S.C. 154(b) by 35 days.

(21) Appl. No.: 16/309,035

(22) PCT Filed: Jun. 16, 2017

(86) PCT No.: PCT/EP2017/064779
§ 371 (c)(1),
(2) Date: Dec. 11, 2018

(87) PCT Pub. No.: WO2017/216348
PCT Pub. Date: Dec. 21, 2017

(65) Prior Publication Data
US 2019/0315386 A1 Oct. 17, 2019

(30) Foreign Application Priority Data
Jun. 17, 2016 (DE) .......................... 10 2016 210 833

(51) Int. Cl.
*B62D 1/19* (2006.01)
*B62D 1/185* (2006.01)

(52) U.S. Cl.
CPC ............. *B62D 1/195* (2013.01); *B62D 1/185* (2013.01)

(58) Field of Classification Search
CPC ......... B62D 1/185; B62D 1/184; B62D 1/195
See application file for complete search history.

(56) References Cited

U.S. PATENT DOCUMENTS

| 7,188,867 | B2 * | 3/2007 | Gatti | B62D 1/195 280/777 |
| 7,963,561 | B2 * | 6/2011 | Waibel | B62D 1/184 280/777 |

(Continued)

FOREIGN PATENT DOCUMENTS

| DE | 102008034807 B | 10/2009 |
| DE | 102009009577 B | 5/2010 |

(Continued)

OTHER PUBLICATIONS

English Translation of International Search Report issued in PCT/EP2017/064779, dated Aug. 25, 2017.

*Primary Examiner* — Nicole T Verley
(74) *Attorney, Agent, or Firm* — thyssenkrupp North America, LLC.

(57) ABSTRACT

A steering column may include an inner casing tube in which a steering spindle is rotatably mounted, an outer casing unit that retains the inner casing tube, and a clamping device that secures the outer casing unit relative to the inner casing tube in a fixing position and enables adjustment in an enabling position. The clamping device comprises an arresting element supported longitudinally on the outer casing unit and, in the fixing position, is connected in a longitudinally non-displaceable manner to an engagement element connected to the inner casing tube and, in the enabling position, is released from the engagement element and enables movement of the inner casing tube relative to the outer casing unit in a longitudinal direction. A plastically-deformable energy absorption device, which includes at least two energy absorption elements and a coupling means, may couple the inner casing tube and the outer casing unit.

9 Claims, 3 Drawing Sheets

(56) References Cited

U.S. PATENT DOCUMENTS

| | | | |
|---|---|---|---|
| 8,689,659 B2 * | 4/2014 | Schnitzer | B62D 1/195 |
| | | | 74/492 |
| 9,623,897 B2 * | 4/2017 | Myohoji | B62D 1/195 |
| 9,623,898 B2 * | 4/2017 | Sakuda | B62D 1/185 |
| 9,738,303 B2 * | 8/2017 | Blatter | B62D 1/195 |
| 9,969,421 B2 * | 5/2018 | Klepp | B62D 1/195 |
| 10,011,293 B2 * | 7/2018 | Nagatani | B62D 1/184 |
| 10,160,475 B2 * | 12/2018 | Uesaka | B62D 1/184 |
| 10,220,872 B2 * | 3/2019 | Yoshihara | B62D 1/184 |
| 10,315,682 B2 * | 6/2019 | Agbor | B62D 1/187 |
| 2007/0019456 A1 | 1/2007 | Shimada | |
| 2007/0194563 A1 | 8/2007 | Menjak | |
| 2010/0018340 A1 | 1/2010 | Schnitzer | |
| 2010/0300238 A1 * | 12/2010 | Ridgway | B62D 1/184 |
| | | | 74/493 |
| 2015/0375773 A1 | 12/2015 | Tinnin | |
| 2016/0137218 A1 | 5/2016 | Heitz | |
| 2016/0159387 A1 | 6/2016 | Okano | |
| 2018/0297626 A1 * | 10/2018 | Huber | B62D 1/192 |
| 2019/0232997 A1 * | 8/2019 | Domig | B62D 1/192 |

FOREIGN PATENT DOCUMENTS

| | | | | |
|---|---|---|---|---|
| DE | 102014016510 A | | 2/2015 | |
| DE | 102013109931 A | | 3/2015 | |
| DE | 102015207230 B | | 3/2016 | |
| DE | 102015204476 B | | 5/2016 | |
| DE | 102018204735 A1 * | | 10/2018 | B62D 1/195 |
| EP | 3072779 A1 * | | 9/2016 | B62D 1/195 |
| EP | 2296956 B1 * | | 10/2016 | B62D 1/184 |
| FR | 3079274 A1 * | | 9/2019 | F16F 7/123 |

* cited by examiner

STEERING COLUMN FOR A MOTOR VEHICLE

CROSS REFERENCE TO RELATED APPLICATIONS

This application is a U.S. National Stage Entry of International Patent Application Serial Number PCT/EP2017/064779, filed Jun. 16, 2017, which claims priority to German Patent Application No. DE 10 2016 210 833.6, filed Jun. 17, 2016, the entire contents of both of which are incorporated herein by reference.

FIELD

The present disclosure generally relates to steering columns, including steering columns for motor vehicles.

BACKGROUND

The prior art discloses different embodiments of such steering columns for adapting the position of the steering wheel to the seat position of the person driving a motor vehicle. In addition to height adjustment by virtue of the inclination of the steering column being set, it is possible, in steering columns of the type in question, for the steering wheel, which is fitted at the rear end of the steering spindle, to be positioned in the vehicle interior by virtue of adjustment in the longitudinal direction of the longitudinal axis of the steering column.

The length-adjustment capability is realized in that the actuating unit, consisting of an outer casing unit and of an inner casing tube, which encases the rotatably mounted steering spindle, can be pushed telescopically in and out and can be secured, i.e. fixed in a releasable manner, in different longitudinal positions by means of a releasable clamping device. The clamping device, also referred to as a securing device, acts on the outer casing unit, which is retained on the vehicle body, wherein in the open state of the clamping device—also referred to equivalently as the enabling or release position—it is possible for the inner casing tube to be displaced in the outer casing unit in order for the position of the steering wheel to be set and in the closed state—also referred to as the fixing position or securing position—the inner casing tube is braced in the outer casing unit and, during normal driving operation, the position of the steering wheel is fixed under the mechanical stressing which would be expected.

A known effective measure for improving occupant safety in the event of a vehicle collision, the so-called crash, in which the driver strikes against the steering wheel at high speed, is that of rendering the steering column so that, even in the fixing position of the clamping device, it can be longitudinally pushed together when the steering wheel is subjected to a high force which exceeds a limit value which arises only in the event of a crash. In order to ensure controlled braking of a body coming into contact with the steering wheel, an energy-absorption device is coupled in between the outer casing unit and the inner casing tube, which during normal operation are fixed to one another by the clamping device, but are pushed together relative to one another in the event of a crash. As a result, the kinetic energy introduced is converted into plastic deformation of an energy-absorption element, for example by virtue of a rip tab being ruptured or of an elongate bending element, for instance a bending wire or bending strip, being bent.

A steering column of the type in question is described in DE 10 2008 034 807 B3. The clamping device described in said document comprises an arresting element which is supported in the longitudinal direction on the outer casing unit and, when the clamping device is fixed in a direction transverse to the longitudinal direction, can be moved into force-fitting and form-fitting engagement with a corresponding engagement element on the inner casing tube in the fixing position. In the enabling position, the arresting element is lifted up from the engagement element, i.e. released, by the clamping device, and therefore the inner casing tube can be displaced in a longitudinal direction in the outer casing unit in order for the position of the steering wheel to be adjusted.

The engagement element is connected to the inner casing tube via an energy-absorption device which, during normal operation, is not subjected to stressing, i.e. forms a rigid connection between the outer casing unit and inner casing tube. In the event of a crash, however, the arresting element introduces such a large force into the engagement element that the outer casing unit and the inner casing tube move longitudinally in relation to one another, wherein the energy-absorption element is deformed and the movement is thus braked in a controlled manner.

Said document DE 10 2008 034 807 B3 also proposes rendering the braking action of the energy-absorption device controllable so that account can be taken, in the event of a crash, of whether the driver is strapped in or not or in order to be able to effect adaptation to parameters such as the driver's weight, distance from the steering and the like. In specific terms, for this purpose, at least two energy-absorption elements are provided, and these can be activated as required by virtue of a coupling means coupling them in between the outer casing unit and the inner casing tube, i.e. moving them into mechanical operative connection between the outer casing unit and the inner casing tube. For this purpose, it is possible, if required, to activate an actuator of the coupling means, for example a pyroelectric actuator or switch, also referred to as a pyroswitch, which mechanically couples the first or the second energy-absorption element, or both energy-absorption elements, into the flow of forces between the casing unit and the casing tube. This makes it possible to realize braking characteristics which are adapted to the respective requirement, in other words a so-called crash level.

The disadvantage with the previously known arrangement, however, is that the coupling means is fastened together with the energy-absorption elements on the inner casing tube and accordingly, during adjustment of the steering column, is moved along in the longitudinal direction, as a result of which a relatively large amount of movement or installation space is taken up.

A similar arrangement is described in US 2015/0375773 A1, in which a pyroelectric actuator of a coupling means is likewise fitted together with the energy-absorption elements on the inner casing tube. Although the energy-absorption elements are arranged in a space-saving manner on the one side of the casing tube, the amount of installation space required by the coupling means, which moves along during adjustment, is likewise disadvantageously large. The same applies, in principle, to the adjustable steering column which is known from DE 10 2009 009 577 B3.

Thus a need exists for a steering column that has at least two crash levels and consumes less installation space.

DETAILED DESCRIPTION

Figure 1:
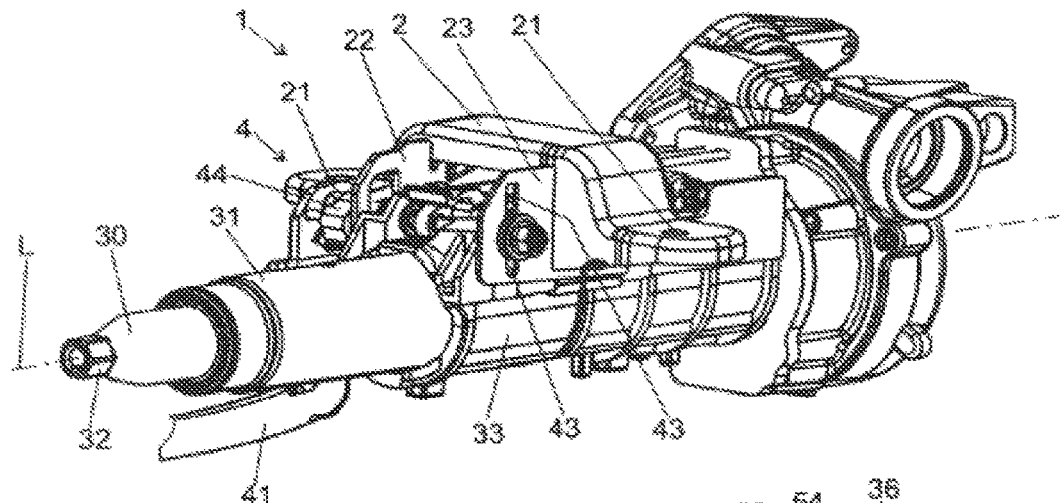
FIG. 1 is a perspective view of an example steering column.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

In some examples, a steering column for a motor vehicle may comprise an inner casing tube, in which a steering spindle is mounted such that it can be rotated about its longitudinal axis, an outer casing unit, in which the inner casing tube is retained and which can be connected, directly or indirectly, to the body of the motor vehicle, and a clamping device, which, in the fixing position, secures the outer casing unit relative to the inner casing tube and, in the enabling position, enables adjustment of the inner casing tube relative to the outer casing unit at least in the longitudinal direction. The clamping device may comprise at least one arresting element, which is supported in the longitudinal direction on the outer casing unit and, in the fixing position, is connected in a longitudinally undisplaceable manner to an engagement element, which is connected to the inner casing tube, and, in the enabling position, is released from the engagement element and enables movement of the inner casing tube relative to the outer casing unit in the longitudinal direction. The inner casing tube and the outer casing unit may be coupled via an energy absorption device, which comprises at least two energy absorption elements and a coupling means. Further, at least a first or a second energy absorption element can be coupled in between the inner casing tube and the outer casing unit, or can be decoupled therefrom, via the coupling means. In the coupled-in state, in the fixing position of the clamping device, the energy absorption element can be plastically deformed during displacement of the inner casing tube relative to the outer casing unit.

In some examples, the energy absorption elements may be arranged between the coupling means and the engagement element, and the coupling means may be connected to the outer casing unit.

In the invention, the coupling means, which comprises for example a pyroelectric actuator, pyroswitch for short, can be fixed to the outer casing unit. In the event of a crash, the force is thus introduced from the outer casing unit, via the coupling means fitted thereon, into at least one or more of the energy-absorption elements, wherein the coupled-in energy-absorption element or elements is or are supported longitudinally on the engagement part against the inner casing tube. Consequently, in the event of a crash, the inner lateral tube of the engagement part is moved relative to the outer lateral unit and the coupling means, which is fixed thereto, and the energy-absorption element or elements, which are coupled thereby, are deformed, with energy being absorbed in the process.

One advantage of the arrangement according to the invention is that during adjustment of the steering column, when the arresting part is released from the engagement part and the inner casing tube is displaced in the longitudinal direction relative to the outer casing unit, both the coupling means and the energy-absorption elements remain in position on the outer casing unit, i.e. they are not, as in the case of the arrangements known in the prior art, moved along in the longitudinal direction. This means that a smaller amount of installation space is required and an advantageous, particularly compact construction can be realized.

The engagement element, which may be designed for example in the form of a toothed plate, can be fastened directly on the outside of the inner casing tube, for example by a rivet connection. It is likewise conceivable, and possible, for the engagement element and the inner casing tube to be designed in the form of a single-piece integral component, for example by virtue of a toothing formation being provided on the inner casing tube or of the inner casing tube comprising equidistant recesses. As a result, the engagement element projects outward to a lesser extent than in the prior art, in which the energy-absorption element or elements is or are inserted between the engagement element and the casing tube.

The coupling means can comprise a movable coupling element which, upon activation of the coupling means, couples in at least one energy-absorption element between the inner casing tube and the engagement element, or decouples the same therefrom. The coupling element is driven by the coupling means as required during actuation, and it is therefore moved relative to the coupling means, and to the outer casing unit, and consequently also relative to at least one of the energy-absorption elements. The relative movement allows the coupling element to connect one or more energy-absorption elements mechanically to the outer casing unit via the coupling means, for example by way of form-fitting engagement, and therefore the relevant energy-absorption element is coupled into the flow of forces between the outer casing unit and the inner casing tube. The additionally coupled-in energy-absorption element or elements allows or allow more energy to be absorbed in the event of a crash, as a result of which the crash level is increased.

As an alternative, it is conceivable, and possible, in the rest state, when the coupling means has not been activated, for at least one of the energy-absorption elements to be coupled by the coupling element into the flow of forces between the inner casing tube and the outer casing unit and upon activation of the coupling means, by the relative movement of the coupling element, for one or more energy-absorption elements to be decoupled, that is to say released, from the connection between the coupling means and the inner casing tube. The decoupled energy-absorption element or elements does not or do not deform in the event of a crash, and therefore a correspondingly lesser amount of energy is absorbed and the crash level is reduced.

In a practical configuration, the coupling means can comprise a pyroelectric actuator, which can be activated in order for the coupling element to be driven pyrotechnically. The pyroelectric actuator comprises a pyrotechnical propellant, which can be ignited by an electric pulse. The explosion of the propellant moves the coupling element relative to the coupling means, and thus relative to at least one of the energy-absorption elements, wherein at least one energy-absorption element is coupled in or decoupled.

The coupling element can comprise a carrier pin which, for coupling-in or decoupling purposes, can be moved transversely to the longitudinal axis and can be moved into, or out of, operative engagement with an energy-absorption element. Upon activation of the coupling means, the carrier pin can be moved in the direction of its pin-like longitudinal extent. The coupling element is preferably arranged alongside the inner casing tube at a distance from the longitudinal axis, and therefore the movement path of the carrier pin runs past the inner casing tube transversely to the longitudinal axis. This provides for a space-saving arrangement of the coupling means on the outer casing unit. It is possible to realize a smaller radial dimensioning, and thus better utilization, of the available installation space than if the coupling element or the carrier pin, as in the prior art, is moved radially in relation to the longitudinal axis.

An advantageous embodiment of the invention makes provision for an energy-absorption element to be designed in the form of an elongate bending element comprising two limbs which are connected to one another via a bent-over portion, wherein the bent-over portion and the limbs are located parallel to a bending plane with a surface normal. In other words, the bent-over portion is formed by a bending operation around a bending axis located parallel to the surface normal. The two limbs of this structure, which is also referred to as a bending strip or bending wire, are connected to one another preferably via a bent-over portion of approximately 180° and consequently, located in the bending plane, extend essentially parallel to one another. The limbs are then located likewise parallel to the longitudinal axis. In the event of a crash, the force is introduced longitudinally into the first of the limbs, while the second limb is supported relative thereto, and therefore one elongate limb of the bending element, running through the bent-over portion, is bent over in relation to the other limb. For coupling-in or decoupling purposes, the coupling means can couple the first limb to the outer casing unit, which is fixed in the event of a crash, or can release the same therefrom. The second limb can be supported in the longitudinal direction on the inner casing tube, which moves relative to the outer casing unit in the event of a crash. In the event of a crash, a bending element, in the coupled-in state, is consequently deformed for energy-absorption purposes; in the decoupled state, it does not absorb any energy in the event of a crash.

The energy-absorption elements are preferably arranged symmetrically in relation to the bending plane, wherein the longitudinal axis coincides with the plane and the plane is arranged orthogonally in relation to the surface normal. The surface normal is preferably arranged parallel to the clamping bolt.

Provision can preferably be made for the first limb of a bending element to be capable of being secured on the coupling means and for the second limb to be capable of being supported on the engagement element in the longitudinal direction. A bending element can be straightforwardly coupled in or decoupled by a coupling element, for example a carrier pin, being moved into engagement with an opening, a carrier hook or the like on the first limb, and thus ensuring the connection of the coupling means, or, as an alternative, by the coupling element being moved out of engagement in the event of a crash and decoupling the bending element from the coupling means and deactivating it as a result. By way of its second limb, the bending element can be supported on the inner casing tube via the engagement element. In the event of a crash, the bending element is deformed only when it is connected to the coupling means via the coupling element.

It is possible for an energy-absorption element to be capable of being supported on the arresting element. In the closed state of the securing device, the arresting element establishes a force fit in the longitudinal direction with the engagement element, which for its part is fixed to the casing tube. In the event of a crash, therefore, the force for deforming the energy-absorption element or elements is introduced into the casing tube via the arresting element and the engagement element. In practice, the arresting element and the engagement element can comprise corresponding connecting elements, for example in the form of form-fitting elements, such as toothing formations or the like, which, when the securing device is closed, can be moved into engagement with one another perpendicularly to the longitudinal axis and are thus fixed to one another in a longitudinally undisplaceable manner by a form fit. The engagement element can be designed, for example, in the form of a longitudinally elongate toothed plate, which is toothed transversely to the longitudinal direction and into which the arresting element, which is designed in the form of a toothed block with a corresponding mating toothing formation, can be brought into engagement in order to set different adjustment positions.

An advantageous configuration makes provision for the arresting element to comprise a transmission element, against which the at least one of the energy-absorption elements can be supported in the longitudinal direction. The transmission element is connected to the arresting element and, in the closed state, ensures that the clamping force of the securing means is transmitted from the arresting element to the engagement element. For this purpose, the transmission element can comprise the connecting elements for connection to the engagement element, for example, as described above, a toothing formation. The at least one energy-absorption element can be supported in the longitudinal direction on the transmission element. Consequently, in the event of a crash, the force is transmitted via the transmission element to the at least one energy-absorption element, which is then deformed by the longitudinal movement relative to the fixed coupling means, with energy being absorbed in the process.

It is advantageous for the transmission element to be connected to the arresting element via a separable connection. During normal operation, the transmission element is fastened on the arresting element via the at that point intact, i.e. non-separated, separable connection and as a result, upon actuation of the securing means, the transmission element is moved together with the arresting element in order to fix, or release, the engagement between the arresting element and engagement element. The separable connection here comprises a predetermined breaking point or predetermined rupturing point and, when a limit force in the longitudinal direction is exceeded, said limit force acting between the engagement element and the arresting element in the event of a crash, said predetermined breaking or rupturing point breaks or ruptures and is severed, i.e. separated, as a result. This means that the transmission element is severed from the arresting element and can move, together with the engagement element fastened on the casing tube, in the longitudinal direction relative to the outer casing unit. The transmission element here introduces the deformation force from the inner casing tube into the energy-absorption element or elements, which are coupled to the outer casing unit via the coupling means.

The separable connection can comprise a predetermined breaking element which is arranged between the arresting element and the transmission element. The predetermined breaking element can form, or comprise, a weak point, for example a predetermined breaking or predetermined rupturing point, which is severed when a previously defined predetermined breaking force is exceeded and which enables movement of the arresting element relative to the transmission element in the longitudinal direction. For example, the predetermined breaking element can comprise a shear pin which has the one end secured on the arresting element and the other end secured on the transmission element and which is sheared off, or broken, by the predetermined breaking force. Such a shear pin can be produced, for example, from a material, for example aluminum or plastic, which is softer or more brittle, and has a lower mechanical loading capability (strength), than the material, usually steel, which is customarily used to produce the arresting element and the engagement element. This ensures a reliable shearing-off or breaking operation in the event of a crash, as a result of which energy can be absorbed in the energy-absorption element or elements coupled in between the transmission element and coupling means.

Provision can be made for an energy-absorption element to be surrounded by a housing, which spatially delimits the deformation of the energy-absorption element in the event of a crash. The housing can be fitted on the outer casing unit, or it can be integrated in the outer casing unit or formed together therewith. The housing interior surrounds the energy-absorption element or elements, and this therefore provides a defined space for controlled deformation. This ensures that, even in the case of the extreme forces which are active in the event of a crash, it is not possible for any uncontrolled yielding to occur during deformation, which is advantageous in respect of functional reliability.

Two or more energy-absorption elements can be arranged radially on the same side of the inner casing tube, as seen in relation to the longitudinal axis. This means that the energy-absorption elements can be combined in a single, integrated energy-absorption device, with at least two crash levels, on one side of the inner casing tube.

The energy-absorption device according to the invention comprises at least two energy-absorption elements, which can be activated individually or together by the coupling means as required. Activation can take place by an energy-absorption element being coupled in between the inner casing tube and the engagement element, or decoupled therefrom, i.e. by a mechanical operative connection between the energy-absorption element and the casing tube and the engagement element being established or broken.

The crash level, or the extent of braking, can be increased by a controlled coupling-in operation of energy-absorption elements and, conversely, can be reduced by decoupling.

It is a particular advantage of the invention that at least said two, and possibly further, energy-absorption elements in an energy-absorption device according to the invention can be structurally combined to form an integrated unit, which can be mounted as a whole on one side of the casing tube or of the steering column. This provides for a particularly compact structure of an energy-absorption device with two or more crash levels, which requires less installation space than in the prior art.

An advantageous embodiment makes provision for at least the first and the second energy absorption element to be arranged adjacent to one another in a sandwich like manner in a radial direction, as seen in relation to the longitudinal axis. In this structure, two or more energy absorption elements are arranged in stack form one above the other or one beside the other and form a particularly compact subassembly. If the energy absorption elements are designed in the form of bending strips, it is possible for them to have a common bending axis parallel to the normal direction or to have at least parallel bending axes, as a result of which they are arranged essentially congruently parallel to one another. It can be advantageous for the bending strips each to be supported by the same end on the coupling device and on the engagement element in the longitudinal direction. A compact structure can be realized by the essentially congruent arrangement one beside the other.

At least two energy-absorption elements can be arranged in a common housing. The housing forms a part of the energy-absorption device which encloses the energy-absorption elements at least to some extent and protects them against harmful influences. It is also possible for fastening elements for the energy-absorption elements, longitudinal guides for the engagement element and the like to be formed in or on the housing. It is preferably the case that, for sealing the energy-absorption device, a sealing element is arranged on the housing, preferably in the form of a molded-on elastomeric sealing element. As a result, the energy-absorption device can be protected against environmental influences such as dust.

In an advantageous structure, a separating element is arranged between the energy-absorption elements. A separating element can be formed, for example, by a partition wall or a partition panel inserted between adjacent energy-absorption elements. This means that adjacent energy-absorption elements are shielded from one another in a functionally reliable manner, and therefore the function of one energy-absorption element cannot be influenced by adjacent energy-absorption elements. This is beneficial in respect of increased operational and functional reliability in the event of a crash.

One embodiment of the invention makes provision for at least one of the energy-absorption elements to be designed in the form of an elongate bending element, also referred to as a bending strip, comprising two limbs which are connected to one another via a bent-over portion, wherein the one limb can be secured on the engagement element and the other limb can be supported on the inner casing tube in the longitudinal direction. It is known to use an energy-absorption element in the form of a bending wire or bending strip which is of U-shaped design as a result of a bent-over portion of preferably 180°, wherein the limbs extend essentially parallel to the longitudinal direction, "essentially parallel" being understood to mean a deviation with a solid angle of ±10°. The end of the one limb is connected to the inner casing tube in terms of movement in the longitudinal direction via the engagement element, for example by being supported on a stop or abutment in the event of a crash. The other end is coupled to the coupling element for coupling-in purposes, for example by the insertion of a pin-like coupling element or carrier, and is carried along by the said end in the longitudinal direction in the event of a crash. During displacement of the two ends relative to one another in the event of a crash, the bending migrates over the longitudinal extent of the bending element, kinetic energy being converted or absorbed as a result of deformation work. According to the invention, two or more elongate bending elements can be arranged radially in stack form one above the other as described above.

A bending strip embodied as described above has its bent-over portion extending parallel to a plane, which is intended to mean that the U-shaped extent is located in a plane or parallel to a plane. In other words, the operation of bending over the bending strips through preferably 180° takes place around a surface normal which is located perpendicularly to said plane. The surface normal runs transversely, preferably perpendicularly, to the longitudinal axis. A respective engagement opening of an energy-absorption element is formed between the limbs and the bent-over portion.

According to the invention, at least two bending strips can be arranged in stack form one above the other in a direction perpendicular to their bending-over plane, that is to say they can be arranged in the direction of said surface normal. Consequently, the first and second limbs of two bending strips stacked one above the other run, at least in part, parallel to one another, as can the regions of the bent-over portion be located in parallel planes. The bending strips are thus stacked one above the other such that they have their engagement openings located at least to some extent congruently one above the other. This makes it possible, for example, for a coupling element in the form of a carrier pin to engage or penetrate, in the direction of the surface normal, through the engagement openings of energy-absorption elements stacked one above the other according to the invention.

In order to realize the arrangement explained above, provision can be made for the energy-absorption elements to be arranged adjacent to one another in a sandwich-like manner transversely to the longitudinal direction, at a distance from the longitudinal axis, wherein the bent-over portion of the bending strips extends in each case parallel to a plane in relation to which the bending strips are arranged perpendicularly in stack form one above the other. As a result of this stack-form arrangement of the bending strips in a direction perpendicular to the plane of their respective bent-over portion, the deformation of the one bending strip does not influence the deformation of the respectively other bending strip. It is thus possible to provide a sandwich-like/stack-form arrangement of two or more bending strips in which the energy-absorption behaviors of the bending strips do not influence one another in an undesirable manner.

It is also advantageous for at least one bending element and/or the housing and/or the separating element to be provided with a sliding coating. This ensures that the deformation of the bending wire or bending strip proceeds uniformly in the event of a crash and is not obstructed by friction or jamming if parts of the bending elements come into contact with one another or with surrounding components, such as the housing. This increases the functional reliability.

Provision is preferably made for the coupling means to comprise a pyroelectric actuator, which can be activated in order for the coupling element to be driven pyrotechnically. A pyroelectric actuator, often also referred to as a "pyro-switch", comprises a pyrotechnical propellant, which can be ignited by an electric pulse. The explosion of the propellant accelerates a movable actuator, which in the present application is connected to a coupling element. The coupling element can thus be moved into engagement with, or disengaged from, the engagement element and the energy-absorption element or can establish a mechanical coupling between the outer casing unit and the energy-absorption element or elements in some other way. Advantages of such a pyroelectric actuator are extremely rapid triggering in the event of a crash and the high level of reliability and actuating force, which if required ensures that one or more energy-absorption elements are reliably coupled in or decoupled. For example, the coupling element can be designed in the form of a pin-like carrier which, in order to lock the engagement element to an energy-absorption element, is shot into, or out of, form-fit apertures.

One embodiment of the invention makes provision for the outer casing unit to be retained in a bracket which can be fixed on the vehicle. This makes it possible to realize a particularly rigid attachment between the steering column and the vehicle.

The casing unit here is retained preferably at a front end of the bracket, such that it can be pivoted about a pivot axis, and is accommodated between two sidepieces of the bracket, wherein the casing unit can be secured in relation to the bracket by means of the clamping device.

Providing the pivot axis between the casing unit and the bracket makes it possible to adjust the inclination of the casing unit in relation to the bracket. The inclination adjustment, also referred to as height adjustment, of the casing unit can thus be simplified further, in contrast to the casing unit being fitted directly on the vehicle by means of an axis member which has to be fitted through an accommodating bore of the casing unit and a corresponding accommodating portion of the vehicle crossmember in order to create the pivot axis.

Figure 2:
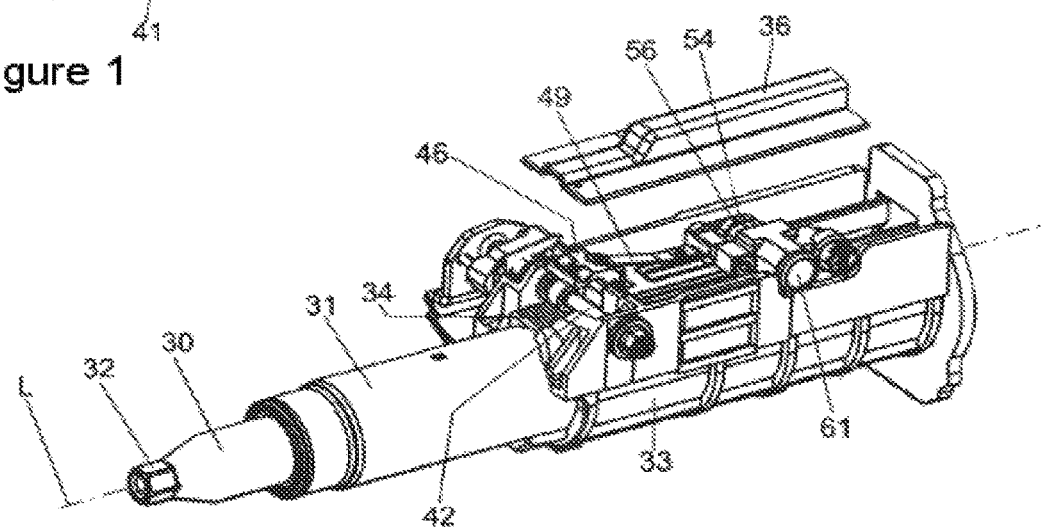
FIG. 2 is a partial, partially-exploded view of the steering column as in FIG. 1.

FIGS. 1 and 2 illustrate a steering column 1 according to the invention schematically in a perspective view as seen obliquely from the rear (in relation to the direction of travel of a motor vehicle (not shown)).

The steering column 1 can be fastened on the body of a motor vehicle (not illustrated) by means of a bracket 2, which for the sake of clarity has been omitted from the view of FIG. 2. For connection to the body, the bracket 2 comprises fastening means 21, from which sidepieces 22, 23 extend.

A steering spindle 30 is mounted in an inner casing tube 31, referred to as casing tube 31 for short, such that it can be rotated about the longitudinal axis L, wherein a steering wheel (not illustrated) can be fitted on a fastening portion 32 at the rear end of the steering spindle 30. The casing tube 31 is retained in a mount which passes longitudinally through an outer casing unit 33, casing unit 33 for short.

A clamping device 4 can be moved, by manual actuation of a clamping lever 41, optionally into a fixing position (securing position, closed state) or enabling position (release position, open state). In the enabling position here, the inner casing tube 31 can be displaced telescopically within the outer casing unit 33 for longitudinal adjustment in the direction of the longitudinal axis L, and the outer casing unit 33 can be adjusted up and down in the height direction H relative to the bracket 2 in accordance with the arrows. In the fixing position, the casing tube 31 is fixed in the casing unit 33 in the longitudinal direction, and the outer casing unit 33 is fixed in the height direction H between the sidepieces 22 and 23. The fixing position corresponds to normal operation of the steering column 1, in which it is ensured that, when the forces act in the customary manner on the steering spindle 30 via the steering wheel, the set position of the steering wheel is not altered in the longitudinal and height directions.

In specific terms, the clamping device 4 comprises a clamping bolt 42, which is connected to the clamping lever 41 in a rotationally fixed manner and is mounted in the outer casing unit 33 in a direction transverse to the longitudinal axis L and such that it can be rotated about its own axis. The clamping bolt 42 is retained on the outer casing unit 33 such that it cannot be displaced in the longitudinal direction, i.e. in the direction of the longitudinal axis L. The clamping bolt 42 is guided through slots 43 in the opposite sidepieces 22, 23. A clamping mechanism 44 which is known per se and can comprise, for example, a first cam plate, which is fitted on the clamping bolt 42 in a rotationally fixed manner, and a second cam plate, which is located opposite the first cam plate and is arranged on the sidepiece 22 in a rotationally fixed manner, is used, when the clamping bolt 42 rotates, to draw the two sidepieces 22 and 23 together in relation to one another, as a result of which the casing unit 33 is clamped in a force-fitting manner between the sidepieces 22 and 23. It is possible, in principle, for the clamping mechanism 44 to make use of any desired known mechanisms, for example cams, tilting pins or rolling bodies, in order to convert rotation of the clamping bolt 42 into a clamping movement.

Figure 3:
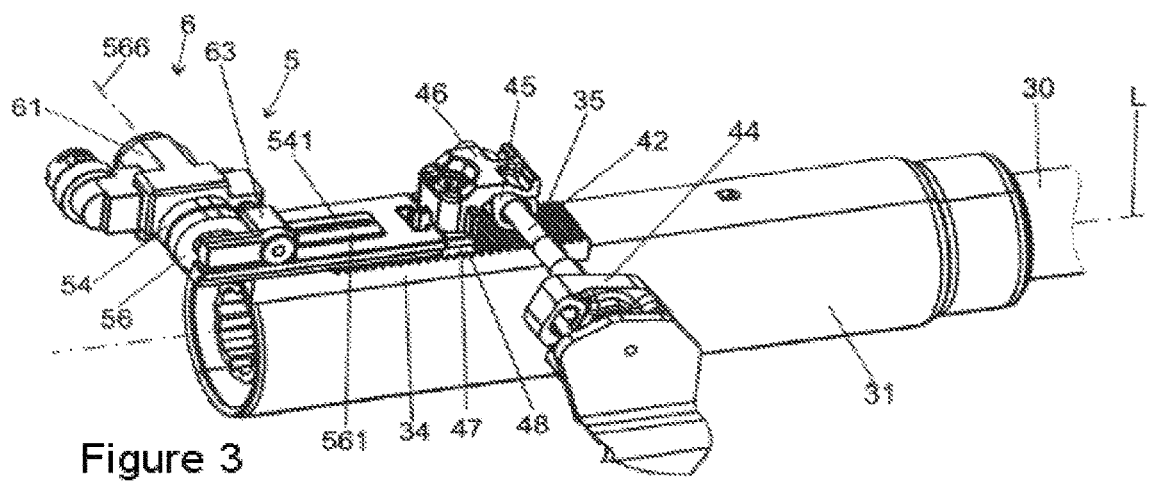
FIG. 3 is a partial view of the casing tube of the steering column as in FIG. 1.
Figure 4:
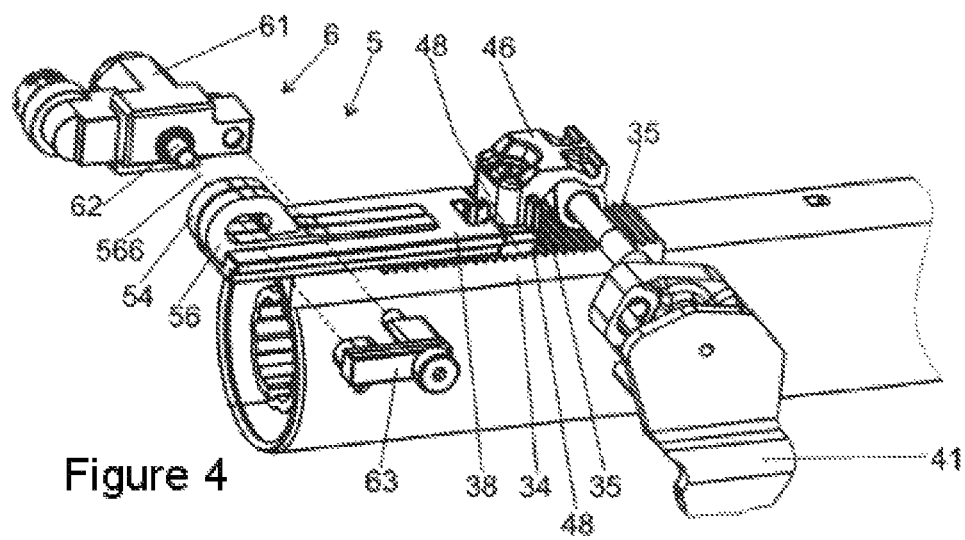
FIG. 4 is a partial, partially-exploded view of the casing tube of the steering column as in FIG. 1.

The casing tube 31 is illustrated on its own in FIGS. 3 and 4, wherein for the sake of clarity the casing unit 33 has been omitted. The interaction of the functional elements can be gathered from the longitudinal sections, taken along the longitudinal axis L, shown in FIGS. 5 and 6.

In order for the casing tube 31 to be fixed in the longitudinal direction relative to the casing unit 33, the casing tube 31 has fitted on it an engagement part 34, which in the example illustrated is designed in the form of a longitudinally extending toothed plate with a toothing formation 35, which is formed along the outer circumference and has teeth in the form of a saw teeth running transversely to the longitudinal axis L. An arresting element 46, which like the clamping bolt 42 is supported on the outer casing unit 33 such that it cannot be displaced in the direction of the longitudinal axis L, comprises a transmission element 47 with a toothing formation 48, which, in order for the fixing position to be set, can be moved into engagement, in a direction transverse to the longitudinal axis L, with the toothing formation 35 of the engagement part 34. In the fixing position, the transmission element 47 is thus connected to the casing tube 31 in a form-fitting manner via the engagement part 34, as seen in relation to the longitudinal direction.

A cam 45 is fitted on the clamping bolt 42 in a rotationally fixed manner, the cam inter-acting with the arresting element 46. If the clamping bolt 42 is rotated into the enabling position, the cam 45 presses against the arresting element 46, as a result of which the toothing formation 48 formed on the transmission element 47 is lifted up out of the toothing formation 35 of the engagement element 34 and is disengaged. The casing tube 31 can then be displaced freely in the longitudinal direction in the casing unit 33 in order for the desired longitudinal position to be set.

Figure 5:
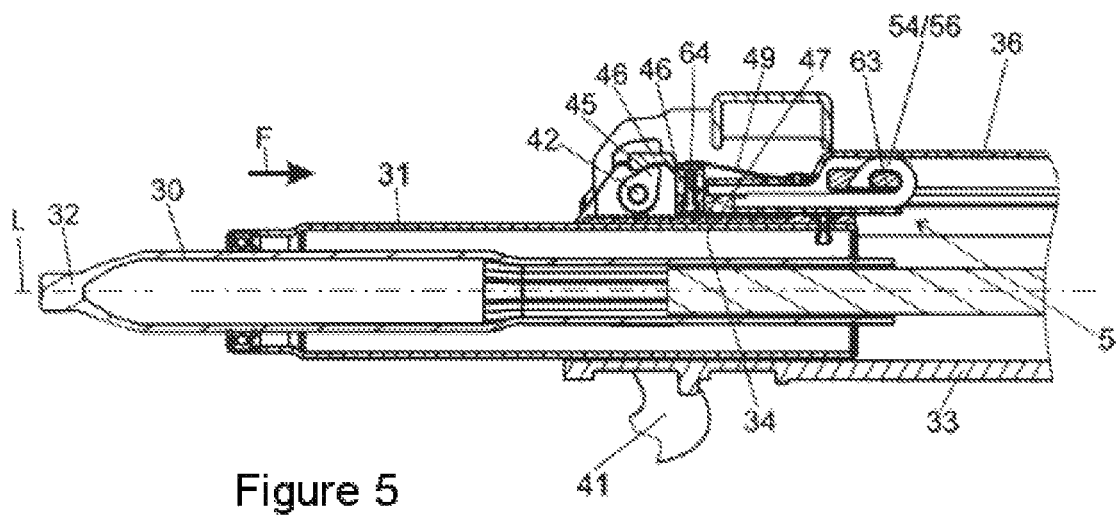
FIG. 5 is a longitudinal sectional view through the example steering column of FIG. 1 in a normal state prior to a crash.

For fixing purposes, the clamping bolt 42 is rotated into the securing position, wherein the arresting element 46, as can be gathered from FIG. 5, is pressed against the engagement element 34 by the pressure-exerting force of a spring element 49, which is supported on the casing unit 33. The toothing formations 35 and 48 here come into form-fitting engagement, and therefore, in the fixing position, the transmission element 47 is connected to the engagement element 34 in a form-fitting manner and is connected to the casing tube 31 such that it cannot be displaced in the direction of the longitudinal axis.

Figure 9:
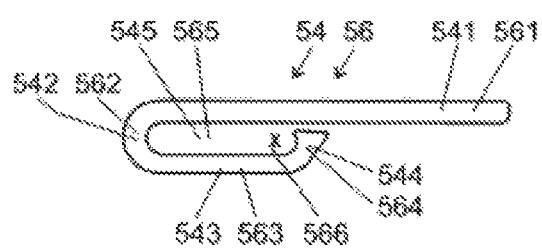
FIG. 9 is a side view of an example energy absorption element (bending strip) in a view seen in a direction normal to a bending plane.

An energy-absorption device 5 comprises a first energy-absorption element 54 and a second energy-absorption element 56. The two energy-absorption elements 54 and 56 are essentially identical in terms of function and shape. In the example illustrated, the energy-absorption elements 54 and 56 are of essentially identical design in terms of shape. As illustrated in FIG. 9, each of the energy-absorption elements 54 and 56 is configured in the form of an arcuate bending wire or bending strip, with a first limb 541 or 561, which is connected to a second limb 543 or 563 via a bent-over portion 542 or 562 of approximately 180°. At the end of the second limb 543 or 563, a respective carrier hook 544 or 564 is formed by an end region bent toward the first limb 541 or 561. Therefore, the limbs 541, 543, the bent-over portion 542 and the carrier hook 544 and the limbs 561, 563, the bent-over portion 562 and the carrier hook 564 each form an engagement opening 545 or 565 of an energy-absorption element 54 or 56. The limbs 541, 543 and 561, 563 are located parallel to the plane of the bent-over portions 542 and 562, said plane being referred to as the bending plane and having a surface normal 566, which in FIG. 9 is located perpendicularly to the plane of the drawing.

The energy-absorption elements 54 and 56 can be designed in the form of punched sheet-metal parts, and this ensures cost-effective production.

It can be gathered from the illustrations of FIGS. 3, 4, 5 and 6 how the energy-absorption elements 54 and 56 are arranged congruently one beside the other, with parallel surface normal 566. This means that the bending strips are arranged such that they have their engagement openings 545 and 565 located preferably congruently, at least to some extent congruently, one above the other.

A coupling means 6 is fastened on the outer casing unit 33. Said coupling means comprises a pyroelectric actuator 61, of which a pin-like coupling element 62 can be moved, by electrical ignition of a pyrotechnical propellant, in a direction transverse to the longitudinal axis L, parallel to the surface normal 566 of the energy-absorption elements 54 and 56. In the non-activated state, the coupling element 62 engages in the engagement opening 545 of the energy-absorption element 54 behind the carrier hook 544, and therefore the energy-absorption element 54 is connected to the casing unit 33 via the coupling means 6. If the propellant is ignited, the pyroelectric actuator 61 moves the coupling element 62 back relative to the energy-absorption element 54, out of the engagement opening 544 of the latter, and therefore the energy-absorption element 54 is mechanically separated, i.e. decoupled, from the casing unit 33.

The energy-absorption element 56, which is adjacent to the energy-absorption element 54, is fixed to the casing unit 33 via a connecting piece 63 of the coupling means 6. As a result, the energy-absorption element 54 remains coupled in between the casing unit 33 and the casing tube 31 when the energy-absorption element 56 is decoupled by activation of the pyroelectric actuator 61.

The limbs 541 and 561, which are directed away from the pyroelectric actuator 61, support the energy-absorption elements 54 and 56 in the direction of the longitudinal axis L against the transmission element 47. In the securing position, as described above, the transmission element 47 is connected in a longitudinally undisplaceable manner to the engagement element 34, and therefore the energy-absorption elements 54 and 56 are arranged, according to the invention, between the coupling means 6 and the engagement element 34.

Figure 6:
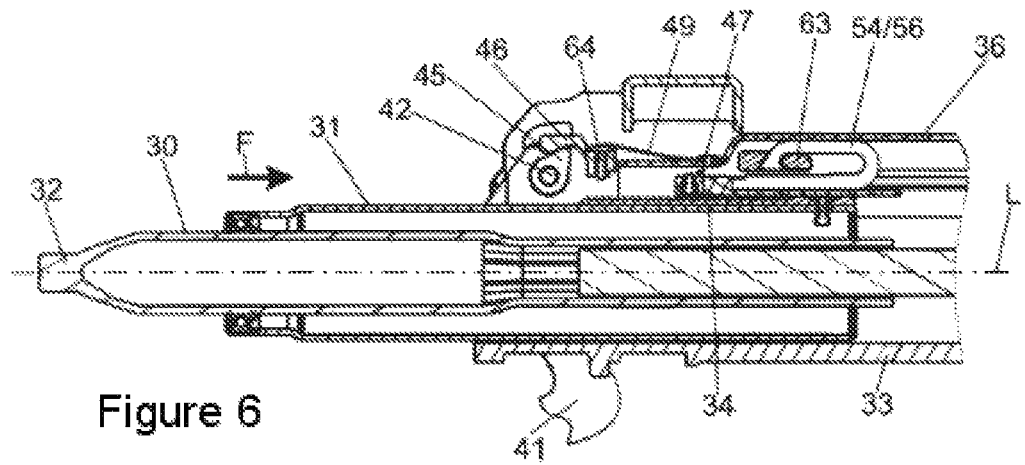
FIG. 6 is a longitudinal sectional view through the example steering column of FIG. 1 following a crash.

In the event of a crash, a person striking against the steering wheel causes a large force F to be transmitted to the casing tube 31 in the longitudinal direction via the steering spindle 30. The force F is introduced into the transmission element 47 via the engagement element 34 and the interengaging toothing formations 35 and 48. The transmission element 47 is connected to the arresting element 46 via a separable connection having a predetermined breaking element 64 in the form of a shear pin. In the event of a crash, when the force F exceeds a predetermined limit value, the predetermined breaking element 64 breaks, i.e. the shear pin is sheared off, and therefore the transmission element 47, as is illustrated in FIG. 6, is severed from the arresting element 46, which is supported in the longitudinal direction against the casing unit 33. Once the predetermined breaking element 64 has broken, the casing tube 31 is pushed forward, as seen in the direction of travel, into the casing unit 33 in the direction of the force F.

Figure 7:
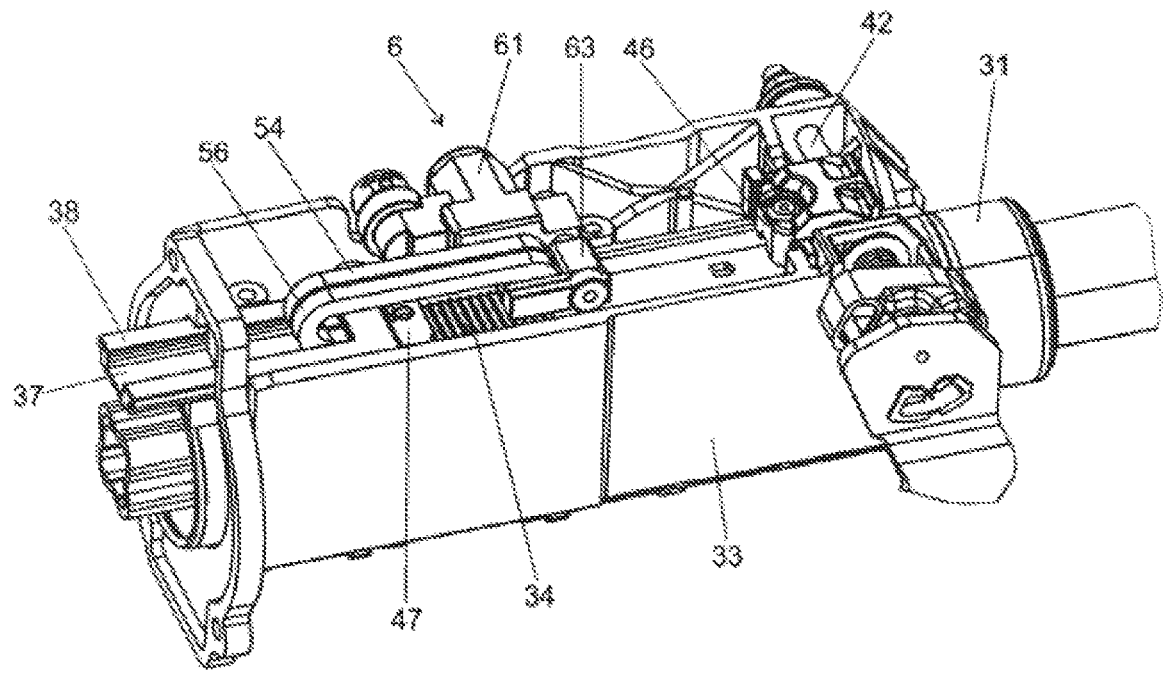
FIG. 7 is a perspective partial view of an example steering column following a crash with a high crash level.

In the event of a crash, the force F is introduced into the energy absorption element 56 via the engagement element 34 and the transmission element 47 connected thereto, said energy absorption element being supported on the coupling means 6 via the connecting piece 63, in which case it is deformed by continuous displacement of the bent over portion 562, with kinetic energy being absorbed in the process. If the pyroelectric actuator 61 has not been triggered by the crash, the second energy absorption element 54 is likewise connected to the fixed casing unit 33 via the coupling element 62 and the coupling means 6, and therefore it is located in the flow of forces between the engagement element 34 and coupling means 6 and is deformed together with the energy absorption element 56. The simultaneously occurring deformation of the energy absorption elements 54 and 56 provides for a high crash level with a large amount of energy being absorbed by the two energy absorption elements 54 and 56. This situation following the event of a crash is illustrated in FIG. 7. It can clearly be seen that both energy absorption elements 54 and 56 have been deformed.

Figure 8:
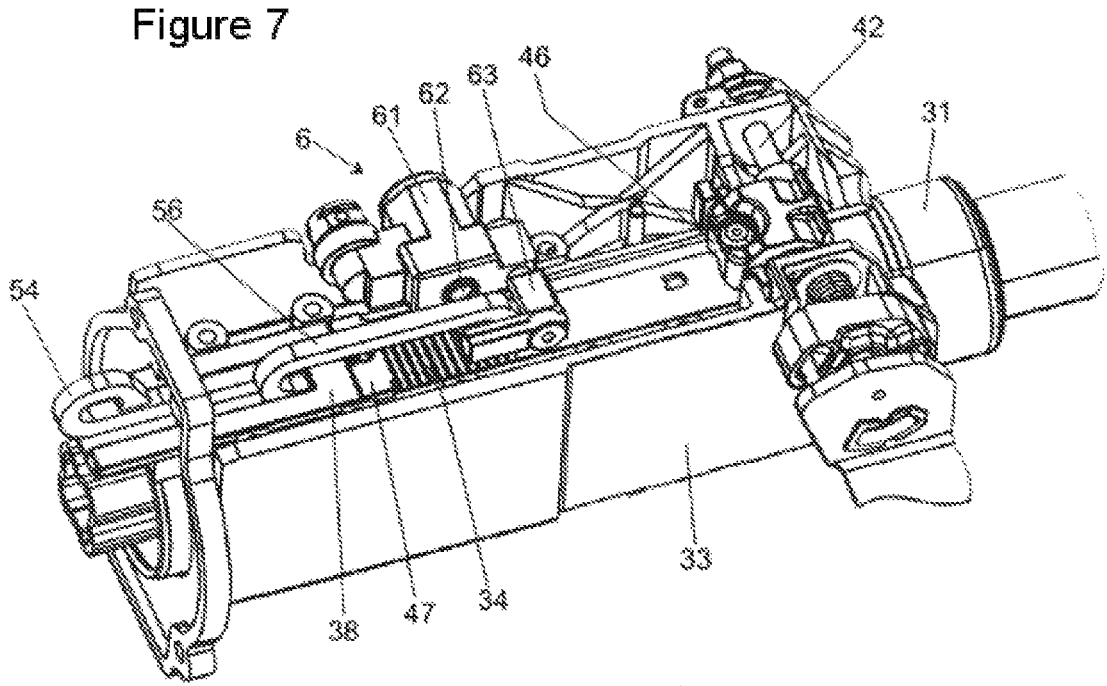
FIG. 8 is a perspective partial view of the example steering column of FIG. 7 following a crash with a low crash level.

If the pyroelectric actuator 61 is actuated in the event of a crash, the energy-absorption element 54 is decoupled and thus deactivated, and therefore it is only the energy-absorption element 56, which is connected to the casing unit 33 on a permanent basis via the connecting piece 63 of the coupling means 6, which is deformed, and this realizes a lower crash level with a smaller amount of energy being absorbed. This situation following the event of a crash is illustrated in FIG. 8. It can be seen that only the energy-absorption element 56 is deformed, whereas the decoupled energy-absorption element 54 has remained in an undeformed state.

In order to prevent the energy-absorption elements 54 and 56 from yielding, and deforming in an uncontrolled manner, in the event of a crash, it is possible to provide a housing 36, which makes available the energy-absorption elements 54 and 56 and a defined deformation space. As can be seen in FIG. 2, the housing 36 can be formed by an essentially trough-like sheet-metal molding, which is fitted on the casing unit 33, as can be gathered from FIGS. 2, 5 and 6.

In order to assist controlled deformation, the limbs 541 and 561 can be arranged in a groove-like recess 37 of a supporting element 38. The supporting element 38 is supported on the transmission element 47 in the direction of the longitudinal axis L. This prevents uncontrolled lateral yielding of the energy-absorption elements 54 and 56 and ensures controlled deformation. The energy-absorption elements 54 and 56 can be supported longitudinally on the transmission element 47 directly or via the supporting element 38, which makes no difference in terms of function.

LIST OF REFERENCE SIGNS

1 Steering column
2 Bracket
21 Fastening means
22, 23 Sidepieces
30 Steering spindle
31 (Inner) casing tube
32 Fastening portion
33 (Outer) casing unit
34 Engagement element
35 Toothing formation
36 Housing
37 Recess
38 Supporting element
4 Clamping device
41 Clamping lever
42 Clamping bolt
43 Slot
44 Clamping mechanism
45 Cam
46 Arresting element
47 Transmission element
48 Toothing formation
49 Spring element
5 Energy-absorption device
54, 56 Energy-absorption element
541, 561 First limb
542, 562 Bent-over portion
543, 563 Second limb
544, 564 Carrier hook
545, 565 Engagement opening
6 Pyroelectric actuator
61 Fastening element
62 Coupling element
63 Connecting piece
64 Predetermined breaking element
L Longitudinal axis

What is claimed is:

1. A steering column for a motor vehicle comprising:
an inner casing tube in which a steering spindle is rotatably mounted about a longitudinal axis of the steering spindle;
an outer casing unit in which the inner casing tube is retained, the outer casing tube being connectable directly or indirectly to a body of the motor vehicle;
a clamping device that secures the outer casing unit relative to the inner casing tube in a fixing position, wherein in an enabling position the clamping device enables adjustment of the inner casing tube relative to the outer casing unit at least in a longitudinal direction, wherein the clamping device comprises an arresting element that is supported in the longitudinal direction on the outer casing unit, wherein in the fixing position the arresting element is connected in a longitudinally non-displaceable manner to an engagement element connected to the inner casing tube, wherein in the enabling position the arresting element is released from the engagement element and enables movement of the inner casing tube relative to the outer casing unit in the longitudinal direction; and an energy absorption device that couples the inner casing tube and the outer casing unit, the energy absorption device comprising at least two energy-absorption elements and a coupling means, with the coupling means being connected to the outer casing unit and the at least two energy-absorption elements being disposed between the coupling means and the engagement element, wherein the coupling means is configured to couple in a coupled-in state or decouple in a decoupled state at least one of the at least two energy-absorption elements between the inner casing tube and the outer casing unit, wherein in the coupled-in state in the fixing position of the clamping device the at least one of the at least two energy-absorption elements is plastically deformable during displacement of the inner casing tube relative to the outer casing unit.

2. The steering column of claim 1 wherein the coupling means comprises a movable coupling element, wherein upon activation of the coupling means the movable coupling element couples in or decouples at least one of the at least two energy-absorption elements between the inner casing tube and the engagement element.

3. The steering column of claim 2 wherein the movable coupling element comprises a carrier that is movable transversely to the longitudinal axis and is movable into or out of operative engagement with at least one of the at least two energy-absorption elements.

4. The steering column of claim 1 wherein at least one of the at least two energy-absorption elements is configured as an elongate bending element with two limbs that are connected to one another via a bent-over portion, wherein the bent-over portion and the two limbs are disposed parallel to a bending plane with a surface normal.

5. The steering column of claim 4 wherein a first of the two limbs of the elongate bending element is securable on the coupling means and a second of the two limbs is supportable on the engagement element in the longitudinal direction.

6. The steering column of claim 1 wherein at least one of the at least two energy-absorption elements is supportable on the arresting element.

7. The steering column of claim 1 wherein the arresting element comprises a transmission element against which at least one of the at least two energy-absorption elements is supportable.

8. The steering column of claim 7 wherein the transmission element is connected to the arresting element via a separable connection.

9. The steering column of claim 1 wherein at least one of the at least two energy-absorption elements is surrounded by a housing, wherein in a crash event the housing spatially delimits deformation of the at least one of the at least two energy-absorption elements that is surrounded.

* * * * *